US009628713B2

United States Patent
Lloyd et al.

(10) Patent No.: US 9,628,713 B2
(45) Date of Patent: Apr. 18, 2017

(54) SYSTEMS AND METHODS FOR OPTICAL IMAGE STABILIZATION USING A DIGITAL INTERFACE

(71) Applicant: Invensense Inc, San Jose, CA (US)

(72) Inventors: Stephen Lloyd, Los Altos, CA (US); Mehran Ayat, Los Altos, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/524,807

(22) Filed: Oct. 27, 2014

(65) Prior Publication Data

US 2015/0319365 A1 Nov. 5, 2015

Related U.S. Application Data

(60) Provisional application No. 61/954,450, filed on Mar. 17, 2014.

(51) Int. Cl.
*H04N 5/232* (2006.01)

(52) U.S. Cl.
CPC ....... *H04N 5/2328* (2013.01); *H04N 5/23258* (2013.01); *H04N 5/23287* (2013.01); *H04N 5/23212* (2013.01)

(58) Field of Classification Search
CPC ............. H04N 5/23287; H04N 5/2328; H04N 5/23258; H04N 5/23212
See application file for complete search history.

(56) References Cited

U.S. PATENT DOCUMENTS

| 8,159,540 | B2 * | 4/2012 | Watanabe | G02B 27/646 348/208.1 |
| 8,928,762 | B2 * | 1/2015 | Yun | G03B 7/26 348/208.11 |
| 2005/0248662 | A1 * | 11/2005 | Yamazaki | H04N 5/23248 348/208.99 |
| 2009/0141137 | A1 * | 6/2009 | Watanabe | G02B 27/646 348/208.99 |
| 2014/0278183 | A1 * | 9/2014 | Zheng | G01P 21/00 702/96 |
| 2015/0097977 | A1 * | 4/2015 | Watanabe | H04N 5/23258 348/208.2 |

* cited by examiner

*Primary Examiner* — Nicholas Giles
(74) *Attorney, Agent, or Firm* — Bay Area Technology Law Group PC

(57) ABSTRACT

Systems and methods are disclosed for implementing optical image stabilization (OIS) in a mobile device. One or more functions associated with OIS may be performed by hardware and/or processing resources that are provided independently of a camera unit.

31 Claims, 4 Drawing Sheets

SYSTEMS AND METHODS FOR OPTICAL IMAGE STABILIZATION USING A DIGITAL INTERFACE

RELATED APPLICATIONS

This application claims the benefit of and priority to U.S. Provisional Patent Application No. 61/954,450, filed Mar. 17, 2014, entitled "Optical Image Stabilization (OIS) Controller," which is incorporated herein by reference in its entirety.

FIELD OF THE PRESENT DISCLOSURE

This disclosure generally relates to architectures for providing optical image stabilization and more specifically to efficient use of gyroscopic motion sensor data in a mobile device.

BACKGROUND

Advances in technology have enabled the introduction of mobile devices that have feature an ever increasing set of capabilities. Smartphones, for example, now offer sophisticated computing and sensing resources together with expanded communication functionality. Likewise, tablets, wearables, media players and other similar devices have shared in this progress. Notably, it is desirable and increasing common to provide a mobile device with digital imaging functions. However, although any camera may be subject to blurring as a consequence of movement when the image is being captured, implementations in a mobile device may be particularly susceptible due to consumer demand for such cameras to be smaller, cheaper and higher in resolution. A camera incorporated into a mobile device is often hand held during use and, despite efforts to be still during image recording, shaking inevitably occurs. Further, providing for increased exposure times is generally desirable, but tends to exacerbate the effects of shaking as well.

An effective technique for minimizing blur in a digital image is optical image stabilization (OIS). Such systems sense motion associated with hand shake and provoke a compensating motion in either the camera lens or the image sensor to reduce blur. As will be appreciated by those of skill in the art, using OIS may provide significantly improved image quality, particularly at higher resolutions, longer exposure times or when employing an optical zoom.

Despite these advantages, OIS systems may require significant hardware and processing resources. To facilitate incorporation into a mobile device, a digital camera featuring OIS may be integrated as a single unit. Generally, such systems include the motion sensor, which may be a two axis gyroscope, sensor processing to determine compensatory motion in response to the sensed motion, actuators to provide the compensatory motion in the image sensor or lens, and position sensors to determine whether the actuators have produced the desired movement.

Further, a conventionally integrated camera and OIS system may require relatively expensive and time consuming calibration. For example, each camera unit may be subjected to test vibrations during the manufacturing process in order to correct for mounting errors, gain errors and/or cross axis errors.

It is also noted that a typical manufacturing process for a digital camera involves cleaning the lens ultrasonically. Technologies used to implement the motion sensor for an OIS system, such as a microelectromechanical systems (MEMS) fabrication, may be damaged by the cleaning process. Accordingly, additional care and costs are associated with the manufacture of camera units featuring completely integrated OIS systems.

In light of the above, it would be desirable to facilitate the incorporation of a digital camera having OIS capabilities into a mobile device. Likewise, it would be desirable to do so while reducing the cost and complexity of a camera unit. Still further, it would be desirable to reduce the burden of manufacturing and calibrating such mobile devices. As will be described in detail below, the techniques of this disclosure satisfy these and other needs.

SUMMARY

As will be described in detail below, this disclosure relates to an optical image stabilization (OIS) system including a first camera unit including a lens, an image sensor and an actuator for moving the lens relative to the image sensor along at least two orthogonal axes, a motion sensor separate from the first camera unit including a gyroscope configured to sense angular velocity of the first camera unit on at least the two orthogonal axes, a motion processor configured to determine movement of the first camera unit based at least in part on output from the motion sensor, an OIS controller configured to output a signal corresponding to a compensating relative movement between the lens and image sensor in response to the determined movement of the first camera unit, an actuator circuit for translating the output signal to actuator movement along the at least two orthogonal axes and a digital interface coupling the actuator circuit and the OIS controller.

In one aspect, the OIS controller and the actuator circuit may be implemented in separate packages coupled by the digital interface, wherein the OIS controller and the motion sensor are implemented in the same package. Alternatively. the OIS controller and the actuator circuit may be implemented in a single package.

In one aspect, the OIS system may include a position sensor configured to determine a position of the lens relative to the image sensor along the at least two orthogonal axes. Further, the position sensor may provide feedback to the actuator circuit. Additionally, the system may include a position circuit configured to receive output from the position sensor to determine the position of the lens relative to the image sensor. In one embodiment, the position circuit, the actuator circuit and the OIS controller are implemented in a single package. The system may also include a position controller to receive feedback from the position circuit.

In one aspect, the OIS system may include a host processor configured to run a process utilizing output from the motion sensor, wherein the motion processor simultaneously provides output to the host processor and the OIS controller. The process utilizing output from the motion sensor may be a user interface function.

In one aspect, the motion sensor further comprises an accelerometer. The motion sensor may also include a magnetometer and a pressure sensor. The OIS system may also include a sensor hub receiving input from at least one additional sensor. Further, the output provided to the host processor by the motion processor may be a result of a sensor fusion operation.

In one aspect, the actuator may be configured to move the lens along three orthogonal axes and the motion sensor may sense motion along three orthogonal axes, such that the OIS system may also include an autofocus (AF) controller configured to output a signal corresponding to movement along at least one of the three orthogonal axes in response to the determined movement of the first camera unit. An image processor receiving output from the image sensor may also provide focus information to the AF controller.

In one aspect, the OIS system may include an image processor receiving output from the image sensor, wherein information from the image processor is used to assess the compensating relative movement between the lens and image sensor.

In one aspect, the OIS system may include a second camera unit, wherein the OIS controller is further configured to output a signal corresponding to a compensating relative movement between a lens and an image sensor of the second camera unit in response to the determined movement.

This disclosure is also directed to methods for optically stabilizing an image. One suitable method may include providing a first camera unit including a lens, an image sensor and an actuator for moving the lens relative to the image sensor along at least two orthogonal axes, sensing motion of the first camera unit using a gyroscope separate from the first camera unit configured to sense angular velocity of the first camera unit on at least the two orthogonal axes, processing the sensed motion to determine movement of the first camera unit, determining a compensating relative movement between the lens and the image sensor in response to the determined movement of the first camera unit and controlling the actuator to produce the compensating relative movement by sending an output signal from a processor that determines the compensating relative movement to an actuator circuit for translating the output signal to actuator movement along the at least two orthogonal axes over a digital interface.

In one aspect, a position of the lens relative to the image sensor along the at least two orthogonal axes may be determined using a position sensor. The position sensor may provide feedback to the actuator circuit and a calibration routine may be performed using the feedback.

In one aspect, movement of the first camera unit may be determined and output to a host processor configured to run a process utilizing output from the motion sensor may be provided simultaneously. The process utilizing output from the motion sensor may be a user interface function. In one embodiment, the motion sensor may include an accelerometer such that providing the output to the host processor by the motion processor includes performing a sensor fusion operation.

In one aspect, the actuator may move the lens along three orthogonal axes and the motion sensor may sense motion along three orthogonal axes, such that the method includes performing an autofocus (AF) process to output a signal corresponding to movement along at least one of the three orthogonal axes in response to the determined movement of the first camera unit. Additionally, output may be received from the image sensor with an image processor, so that the AF process includes focus information determined by the image processor.

In one aspect, output from the image sensor may be processed to assess the compensating relative movement between the lens and image sensor. Additionally, a calibration routine may be performed using the assessment of the compensating relative movement.

In one aspect, the motion sensor and the actuator may be calibrated independently.

In one aspect, a second camera unit having a lens, an image sensor and an actuator for moving the lens relative to the image sensor along at least two orthogonal axes may be provided, so that the method includes determining a compensating relative movement between the lens and the image sensor of the second camera unit and controlling the actuator of the second camera

DETAILED DESCRIPTION

Figure 1:
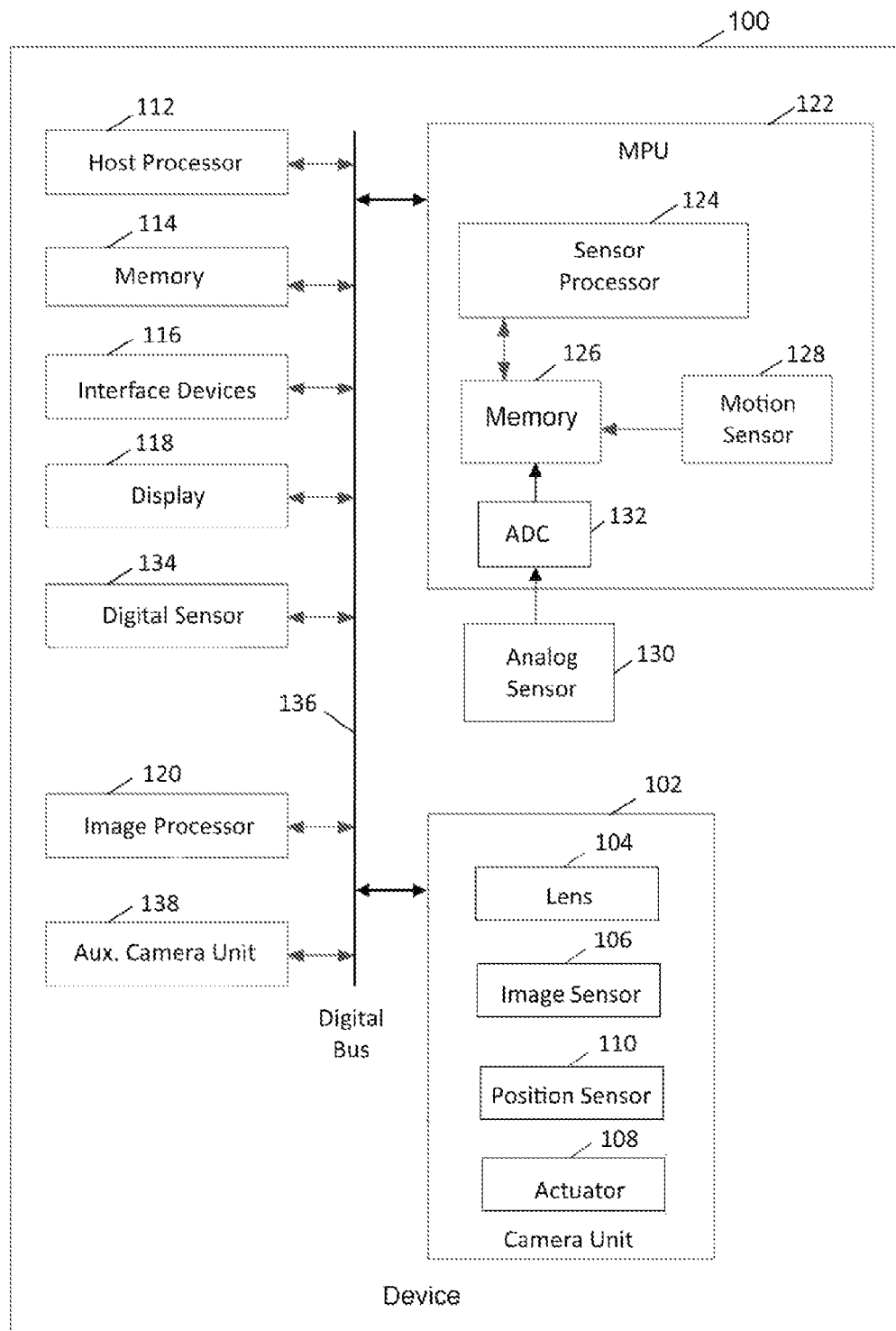
FIG. 1 is a schematic diagram of a device for providing OIS of a digital image according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, it is increasingly desirable to provide a mobile electronic device with one or more digital cameras. Correspondingly, it is also desirable to provide OIS systems to improve the image quality produced by such cameras. This disclosure is directed to reducing the costs and complexities associated with conventional OIS implementations. In particular, one or more functions associated with OIS may be performed by hardware and/or processing resources that are provided independently of a camera unit. For example, a mobile device may have a gyroscope and/or other suitable motion sensor that performs functions unrelated to OIS. Notably, a mobile device may employ motion sensors as part of the user interface, such as for determining orientation of the device to adjust the display of information accordingly as well as for receiving user input for controlling an application, for navigational purposes, or for a wide variety of other applications. Data from such a sensor may be used to determine motion of the mobile device for OIS so that the camera unit does not require a dedicated motion sensor. As will be appreciated, the user interface functions may not be required during image recording or the motion sensor may be able to perform both functions (as well as others) simultaneously. Further, a processor or processing resources utilized for other functions in the mobile device, such as processing the sensor data, may be employed to perform tasks associated with OIS, reducing or removing the need to provide dedicated OIS processing on the camera unit. Such architecture designs allow for a simplified camera unit, as well as facilitating manufacture and calibration.

Details regarding one embodiment of a mobile electronic device 100 including features of this disclosure are depicted as high level schematic blocks in FIG. 1. As will be appreciated, device 100 may be implemented as a device or apparatus, such as a handheld device or a device that is secured to a user. In one embodiment, device 100 may be configured as a smartphone as discussed in further detail below. However, the device may also be a tablet, laptop, personal digital assistant (PDA), video game player, video game controller, navigation device, mobile internet device (MID), personal navigation device (PND), portable music, video, or media player, remote control, or other handheld device, or a combination of one or more of these devices.

As shown, device 100 includes a camera unit 102, incorporating lens 104, image sensor 106, actuator 108 for imparting relative movement between lens 104 and image sensor 106 along at least two orthogonal axes, and position sensor 110 for determining the position of lens 104 in relation to image sensor 106. In one aspect, actuator 108 may be implemented using voice coil motors (VCM) and position sensor 110 may be implemented with Hall sensors, although other suitable alternatives may be employed. Device 100 may also include a host processor 112, memory 114, interface devices 116 and display 118. Host processor 112 can be one or more microprocessors, central processing units (CPUs), or other processors which run software programs, which may be stored in memory 114, associated with the functions of device 100. Interface devices 16 can be any of a variety of different devices providing input and/or output to a user, such as audio speakers, buttons, touch screen, joystick, slider, knob, printer, scanner, computer network I/O device, other connected peripherals and the like. Display 118 may be configured to output images viewable by the user and may function as a viewfinder for camera unit 102. Further, the embodiment shown features dedicated image processor 120 for receiving output from image sensor 106, although in other embodiments this functionality may be performed by host processor 112 or other processing resources.

Accordingly, multiple layers of software can be provided in memory 114, which may be any combination of computer readable medium such as electronic memory or other storage medium such as hard disk, optical disk, etc., for use with the host processor 112. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 also includes integrated motion processing unit (MPU™) 122 featuring sensor processor 124, memory 126 and motion sensor 128. Memory 126 may store algorithms, routines or other instructions for processing data output by motion sensor 128 and/or other sensors as described below using logic or controllers of sensor processor 124, as well as storing raw data and/or motion data output by motion sensor 128 or other sensors. Motion sensor 128 may be one or more sensors for measuring motion of device 100 in space. Depending on the configuration, MPU 122 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 124 or other processing resources of device 100 provides a six axis determination of motion. As desired, motion sensor 128 may be implemented using MEMS to be integrated with MPU 122 in a single package. Exemplary details regarding suitable configurations of host processor 112 and MPU 122 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety. Further, MPU 122 may be configured as a sensor hub by aggregating sensor data from additional processing layers as described in co-pending, commonly owned U.S. patent application Ser. No. 14/480,364, filed Sep. 8, 2014, which is also hereby incorporated by reference in its entirety. Suitable implementations for MPU 122 in device 100 are available from InvenSense, Inc. of Sunnyvale, Calif. Thus, MPU 122 is configured to provide motion data for purposes independent of camera unit 102, such as to host processor 112 for user interface functions, as well as enabling OIS functionality.

Device 100 may also include other sensors as desired. As shown, analog sensor 130 may provide output to analog to digital converter (ADC) 132 within MPU 122. Alternatively or in addition, data output by digital sensor 134 may be communicated over digital bus 136 to sensor processor 124 or other processing resources in device 100. Analog sensor 130 and digital sensor 134 may provide additional sensor data about the environment surrounding device 100. For example, sensors such as one or more pressure sensors, magnetometers, temperature sensors, infrared sensors, ultrasonic sensors, radio frequency sensors, or other types of sensors can be provided. In one embodiment, data from a magnetometer measuring along three orthogonal axes may be fused with gyroscope and accelerometer data to provide a nine axis determination of motion. Further, a pressure sensor may be used as an indication of altitude for device 100, such that a sensor fusion operation may provide a ten axis determination of motion. In the context of the OIS techniques of this disclosure, any combination of sensors, including motion sensor 128, analog sensor 130 and digital sensor 134, all of which may be implemented independently of camera unit 102, may be used to determine angular velocity of device 100 along the two orthogonal axes associated with the plane of image sensor 106.

In the embodiment shown, camera unit 102, MPU 122, host processor 112, memory 114 and other components of device 100 may be coupled through digital bus 136, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 112 and memory 114.

As noted above, multiple layers of software may be employed as desired and stored in any combination of memory 114, memory 126, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 112 and MPU 122, for example, to transmit desired sensor processing tasks. Other embodiments may feature any desired division of processing between MPU 122 and host processor 112 as appropriate for the applications and/or hardware being employed. For example, lower level software layers may be provided in MPU 122 and an API layer implemented by host processor 112 may allow communication of the states of application programs as well as sensor commands. Some embodiments of API implementations in a motion detecting device are described in co-pending U.S. patent application Ser. No. 12/106,921, incorporated by reference above.

Additionally, device 100 may include a plurality of digital imaging modules, each of which may implement OIS utilizing general purpose motion sensing and/or processing capabilities according to the techniques of this disclosure. For example, device 100 is shown with auxiliary camera unit 138. Although not shown for the purposes of clarity, one of skill in the art will appreciate that auxiliary camera unit 138 may include sufficient assemblies for OIS, such as actuators, position sensors and the like as described in the context of camera unit 102 or the other camera units of this disclosure. In one embodiment, device 100 may be a smartphone, camera unit 102 may be configured as a rear-facing camera and auxiliary camera unit 138 may be configured as a front-facing camera. In other embodiments, any suitable number of camera units may utilize the motion sensing capabilities of device 100 to implement OIS.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to processed raw data, which may involve applying a sensor fusion algorithm or applying any other algorithm. In the case of a sensor fusion algorithm, data from one or more sensors may be combined to provide an orientation of the device. In the described embodiments, an MPU may include processors, memory, control logic and sensors among structures.

Figure 2:
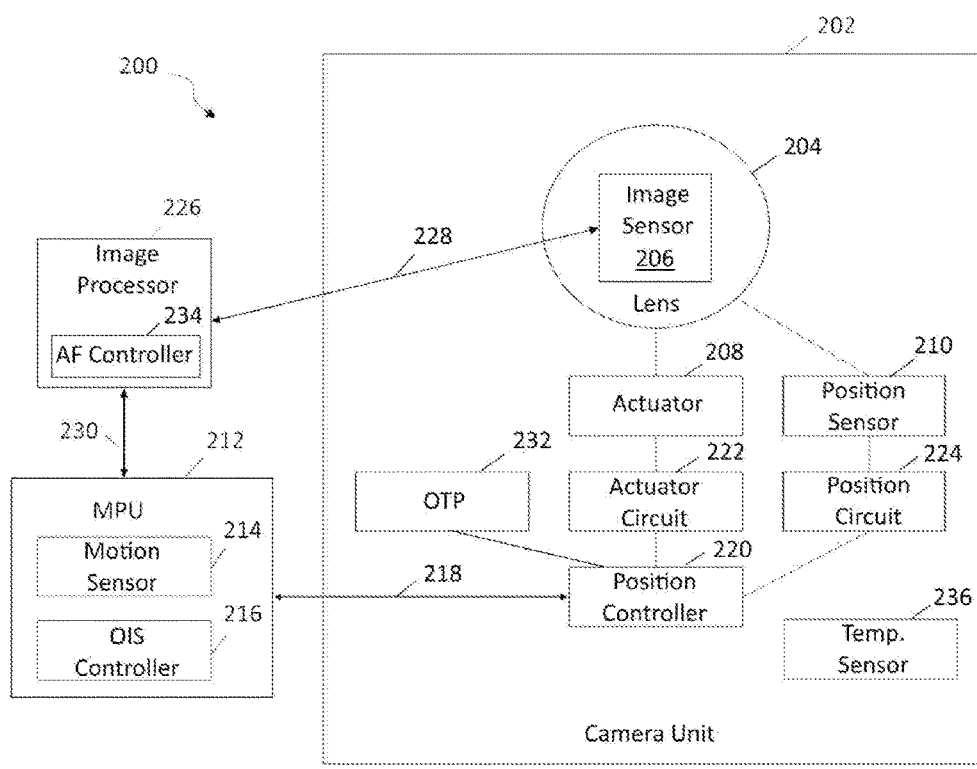
FIG. 2 is a schematic diagram of a device for providing OIS featuring an integrated motion sensor and OIS controller separate from a camera unit according to an embodiment.

Turning to FIG. 2, one suitable configuration of mobile device 200 is shown schematically in reference to communications between camera unit 202 and MPU 212. Similar to the embodiment shown in FIG. 1, camera unit 202 includes lens 204, image sensor 206, actuator 208 for imparting relative movement between lens 204 and image sensor 206 along at least two orthogonal axes, and position sensor 210 for determining the position of lens 204 in relation to image sensor 206. As shown, MPU 212 includes motion sensor 214, such as gyroscopes to measure angular velocity of device 200 along at least two orthogonal axes corresponding to the plane of image sensor 206. MPU 212 may also receive motion sensor data from other integrated or external sensors as described above, and may perform a sensor fusion operation to provide refined motion sensing, such as in the form of a six axis or nine axis motion determination. MPU 212 also includes OIS controller 216 to determine compensating relative motion between lens 204 and image sensor 206 to counter act shaking or other movement detected by motion sensor 214 and reduce blur in images recorded by image sensor 206. For example, OIS controller 216 may be implemented using the equivalent of sensor processor 124 or by other suitable processing resources. In this embodiment, MPU 212 may be configured as a single die or may be two dies stacked into the same package.

In one aspect, OIS controller 216 may output a signal representing an amount of relative movement between lens 204 and image sensor 206 to compensate for motion detected by motion sensor 214. The signal, such as a digital control word corresponding to the desired movement, may be sent over OIS digital interface 218 to position controller 220 in camera unit 202. In turn, position controller 220 may send the desired movement to actuator circuit 222 to be translated into the appropriate control signals for actuator 208, such as by converting the desired movement into corresponding movements in each orthogonal axis of operation for actuator 208. As also shown, the data provided by position sensor 210 is processed by position circuit 224 to determine the actual relative movement between image sensor 206 and lens 204 produced by actuator 208. This determination may be provided as feedback to position controller 220 to help ensure that actuator 208 is operated in a manner that produces the desired amount of movement.

In another aspect, image sensor 206 is depicted as outputting data to image processor 226 over camera digital interface 228. Further, image processor 226 may be coupled to MPU 212 using host digital interface 230. By utilizing feedback from image processor 226, OIS controller 216 may refine the signal used to indicate the desired movement to actuator 208. For example, image processor 226 may determine pixel shift as known in the art to assess the degree to which the compensating movement determined by OIS controller 216 has succeeded in reducing blur. This information may be used in the calibration process of motion sensor 214, as well as in the calibration process of the actuator 208 and position sensor 210 loop mediated by position controller 220. In some embodiments, feedback from image processor 226 may obviate the need for position sensor 210 and position circuit 224. For example, a sufficient reduction in pixel shift as determined by image processor 226 may be taken as an indication that actuator 208 has produced the desired relative movement between image sensor 206 and lens 204 without requiring the measurement provided by position sensor 210. Although shown as a dedicated processor, image processor 226 may also be implemented using any suitable processing resources of device 100. For example, the functionality of image processor 226 may be provided by an application processor, such as host processor 112, a processor in MPU 212 or a processor in camera unit 202.

As will be appreciated from the architecture shown in FIG. 2, separating the motion sensing capabilities from camera unit 202 enables a number of suitable calibration strategies. Actuator 208 and/or position sensor 210 and their associated circuitry may be calibrated independently of motion sensor 214. A synthetic test signal may be provided to position controller 220 to determine suitable offsets, sensitivity or gain adjustments, cross axis compensations, or any other calibration parameters for actuator 208 and/or position sensor 210. Such values may be determined during manufacture and stored in one-time programmable (OTP) memory 232 or other suitable non-volatile storage means. For example, a digital control word representing a defined movement may be sent to position controller 220 to determine any necessary adjustment so that actuator 208 responds with the defined movement. Alternatively or in addition, a reference signal provided by a single motion sensor having known characteristics may be supplied to a plurality of camera units to perform the calibration process. Such techniques may reduce or eliminate the need to perform a conventional vibration process involving each device under test being shaken during manufacture as part of the calibration. Feedback from image processor 226 may also be used for run time calibration as desired. For example, proper OIS operation may be confirmed and suitable adjustments made based on a determination by image processor 226 of pixel shift in the output of image sensor 206. Notably, calibration parameters determined from image processor 226 may be aggregated during run time to provide look up reference during subsequent operations. In one aspect, the techniques of this disclosure may be facilitated by separately calibrating motion sensor 214 to a desired level. For example, a gyroscope may be calibrated to a sensitivity of approximately 1% or less.

In a further aspect, camera unit 202 may also offer auto focus (AF) capabilities. Actuator 208 may be configured to produce motion in three orthogonal axes. As described above, relative motion in the two orthogonal axes associated with the plane of image sensor 206 may be employed for OIS purposes while relative motion in the third orthogonal axis may focus the image on image sensor 206. Similarly, position sensor 210 may also be configured to measure relative position along all three orthogonal axes to provide feedback for the AF system as well as the OIS system. AF controller 234 may be implemented as part of image processor 226 to provide a focusing signal as known in the art. In one embodiment, the focusing signal may be sent to MPU 212 over interface 230 so that it may be incorporated into the signal provided by OIS controller 216. Such an embodiment allows a single combined positional signal reflecting both AF and OIS adjustments to be sent to position controller 220. Suitable AF adjustments may be made by employing motion data determined by MPU 212.

In yet another aspect, device 200 may include temperature sensor 236. Although depicted as being implemented in camera unit 202, the temperature sensor may be provided by as another sensor, such as analog sensor 130 or digital sensor 134. As desired, operation of actuator 208 and/or position sensor 210 may be adjusted depending on the measurements of temperature sensor 236.

The embodiment shown in FIG. 2 shows three digital interfaces, OIS digital interface 218, camera digital interface 228 and host digital interface 230. Depending on the configuration, these interfaces may be separate, may be a single interface such as bus 136 in FIG. 1, or may be any combination of these implementations. For example, as described above, feedback from AF controller 234 may be provided to MPU 212. In other embodiments, feedback from AF controller 234 may be delivered directly to camera unit 202 to allow for AF operation without invoking OIS controller 216. Correspondingly, MPU 212 may be operated in a power save mode of operation, while still allowing AF capabilities for camera unit 202. In another aspect, OIS digital interface 218 may be configured to utilize a low latency communication protocol to facilitate rapid adjustments to actuator 208 to compensate for the detected shaking of device 200. For example, pulse width modulation or other similar techniques may be used.

Figure 3:
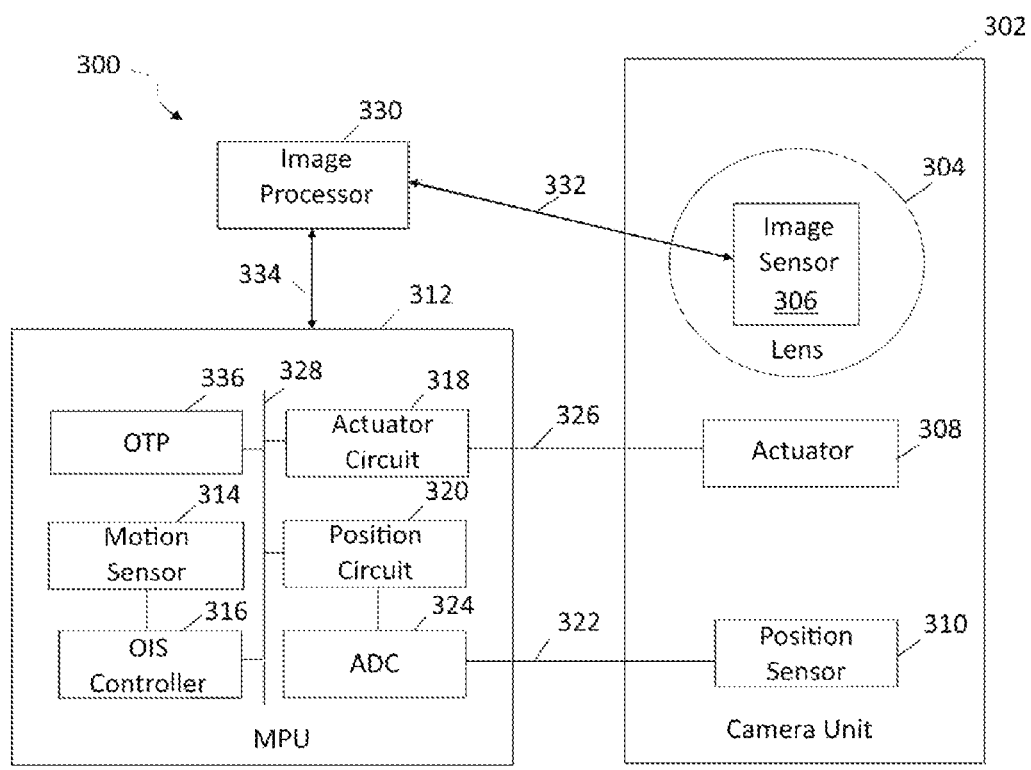
FIG. 3 is a schematic diagram of a device for providing OIS featuring an integrated motion sensor, OIS controller, actuator circuit and position circuit separate from a camera unit according to an embodiment.

Another embodiment of this disclosure is schematically depicted in FIG. 3 in reference to mobile device 300. As in other embodiments, camera unit 302 may also include lens 304, image sensor 306, actuator 308 and position sensor 310. In a separate module, MPU 312 includes motion sensor 314 and OIS controller 316. Each of these components may function in a similar manner to the corresponding elements described above. In this embodiment, MPU 312 implements actuator circuit 318 and position circuit 320 in a single package to reduce the complexity and cost of camera unit 302. Other combinations of the architectures represented by FIGS. 2 and 3 may also be used, such as by incorporating one of the position circuit and the actuator circuit in the MPU and the other in the camera unit. As shown, output from position sensor 310 may be communicated over position interface 322 to ADC 324. In one aspect, ADC 324 may be used for another purpose in MPU 312, as in the example of ADC 132 shown in FIG. 1. Actuator circuit 318 may receive a signal from OIS controller 316 corresponding to the desired relative movement between lens 304 and image sensor 306 to compensate for shaking detected by motion sensor 314. Accordingly, actuator circuit 318 may separate the desired movement into corresponding motion of actuator 308 along each of two orthogonal axes, as communicated over actuator interface 326. If desired, position interface 322 and actuator interface 326 may be combined. In the embodiment shown, actuator circuit 318, position circuit 320 and OIS controller 316 may coupled by internal digital bus 328, although other suitable configurations may be employed. Image sensor 306 may transmit data to image processor 330 over camera digital interface 332, which may in turn be coupled to MPU 312 with host digital interface 334. As described above, OTP 336 may be used for storing suitable calibration values determined during manufacture.

Figure 4:
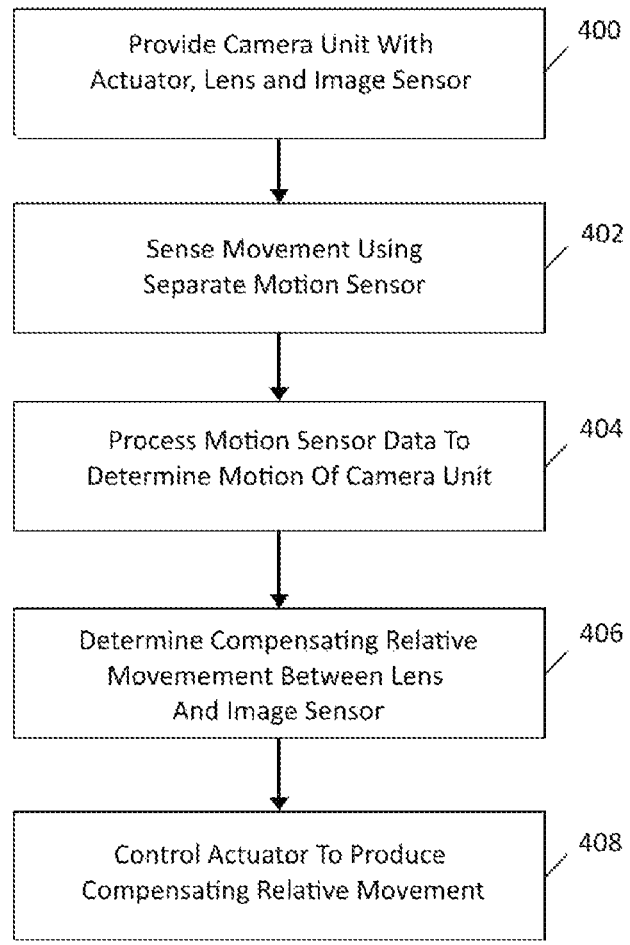
FIG. 4 is a flowchart showing a routine for providing OIS of a digital image according to an embodiment.

To help illustrate aspects of this disclosure, FIG. 4 is a flow chart showing a suitable process providing OIS in a mobile device with a digital camera unit. As indicated by 400, a first camera unit, such as camera unit 202, may be provided with a lens, an image sensor and an actuator for moving the lens relative to the image sensor along at least two orthogonal axes. In 402, a motion sensor such as motion sensor 214 may be used to sense motion of the first camera unit. Since motion sensor 214 and camera unit 202 are both part of mobile device 200, movement of motion sensor 214 may be taken as an indication of movement of camera unit 202. In 404, the sensed motion may be processed to determine movement of the first camera unit, such as by MPU 212. Next, a compensating relative movement between the lens and the image sensor may be determined in response to the determined movement of the first camera unit, such as by OIS controller 216, in 406. The actuator may be controlled in 408 to produce the compensating relative movement by sending an output signal from OIS controller to an actuator circuit for translating the output signal to actuator movement along the at least two orthogonal axes over a digital interface, such as actuator circuit 222.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. An optical image stabilization (OIS) system comprising:
    a first camera unit including a lens, an image sensor and an actuator for moving the lens relative to the image sensor along at least two orthogonal axes;
    a motion sensor separate from the first camera unit including a gyroscope configured to sense angular velocity of the first camera unit on at least the two orthogonal axes;
    a motion processor configured to determine movement of the first camera unit based at least in part on output from the motion sensor;
    an OIS controller configured to output a signal corresponding to a compensating relative movement between the lens and image sensor in response to the determined movement of the first camera unit;
    an actuator circuit for translating the output signal to actuator movement along the at least two orthogonal axes;
    a digital interface coupling the actuator circuit and the OIS controller; and
    a host processor configured to run a process utilizing output from the motion sensor, wherein the motion processor is configured to simultaneously provide output to the host processor and the OIS controller.

2. The OIS system of claim 1, further comprising a position sensor configured to determine a position of the lens relative to the image sensor along the at least two orthogonal axes.

3. The OIS system of claim 2, wherein the position sensor provides feedback to the actuator circuit.

4. The OIS system of claim 3, further comprising a position circuit configured to receive output from the position sensor to determine the position of the lens relative to the image sensor.

5. The OIS system of claim 4, wherein the position circuit, the actuator circuit and the OIS controller are implemented in a single package.

6. The OIS system of claim 4, further comprising a position controller receiving feedback from the position circuit.

7. The OIS system of claim 1, wherein the process utilizing output from the motion sensor comprises a user interface function.

8. The OIS system of claim 1, wherein the motion sensor further comprises an accelerometer.

9. The OIS system of claim 8, wherein the motion sensor further comprises a magnetometer and a pressure sensor.

10. The OIS system of claim 8, wherein the output provided to the host processor by the motion processor comprises a result of a sensor fusion operation, wherein the host processor is configured to run a process utilizing output from the motion sensor.

11. The OIS system of claim 1, further comprising a sensor hub receiving input from at least one additional sensor.

12. The OIS system of claim 1, wherein the actuator moves the lens along three orthogonal axes and wherein the motion sensor senses motion along three orthogonal axes, further comprising an autofocus (AF) controller configured to output a signal corresponding to movement along at least one of the three orthogonal axes in response to the determined movement of the first camera unit.

13. The OIS system of claim 12, further comprising an image processor receiving output from the image sensor, wherein the image processor provides focus information to the AF controller.

14. The OIS system of claim 1, further comprising an image processor receiving output from the image sensor, wherein information from the image processor is used to assess the compensating relative movement between the lens and image sensor.

15. The OIS system of claim 1, further comprising a second camera unit, wherein the OIS controller is further configured to output a signal corresponding to a compensating relative movement between a lens and an image sensor of the second camera unit in response to the determined movement.

16. A method for optically stabilizing an image, comprising:
    providing a first camera unit including a lens, an image sensor and an actuator for moving the lens relative to the image sensor along at least two orthogonal axes;

sensing motion of the first camera unit using a motion sensor comprising a gyroscope separate from the first camera unit configured to sense angular velocity of the first camera unit on at least the two orthogonal axes;

processing the sensed motion using a motion processor to determine movement of the first camera unit;

determining a compensating relative movement between the lens and the image sensor in response to the determined movement of the first camera unit;

controlling the actuator to produce the compensating relative movement by sending an output signal from an OIS controller that determines the compensating relative movement to an actuator circuit for translating the output signal to actuator movement along the at least two orthogonal axes over a digital interface; and simultaneously providing output from the motion processor to the host processor configured to run a process utilizing output from the motion sensor and the OIS controller.

17. The method of claim 16, further comprising determining a position of the lens relative to the image sensor along the at least two orthogonal axes using a position sensor.

18. The method of claim 17, further comprising providing feedback from the position sensor to the actuator circuit.

19. The method of claim 18, further comprising performing a calibration routine using the feedback.

20. The method of claim 16, further comprising simultaneously determining movement of the first camera unit and providing output to a host processor configured to run a process utilizing output from the motion sensor.

21. The method of claim 20, wherein the process utilizing output from the motion sensor is a user interface function.

22. The method of claim 20, wherein the motion sensor further comprises an accelerometer and providing the output to the host processor by the motion processor comprises performing a sensor fusion operation.

23. The method of claim 16, wherein the actuator moves the lens along three orthogonal axes and wherein the motion sensor senses motion along three orthogonal axes, further comprising performing an autofocus (AF) process to output a signal corresponding to movement along at least one of the three orthogonal axes in response to the determined movement of the first camera unit.

24. The method of claim 23, further comprising receiving output from the image sensor with an image processor, wherein the AF process includes focus information determined by the image processor.

25. The method of claim 16, further comprising processing output from the image sensor to assess the compensating relative movement between the lens and image sensor.

26. The method of claim 25, further comprising performing a calibration routine using the assessment of the compensating relative movement.

27. The method of claim 16, further comprising calibrating the motion sensor and the actuator independently.

28. The method of claim 16, further comprising:

providing a second camera unit including a lens, an image sensor and an actuator for moving the lens relative to the image sensor along at least two orthogonal axes;

determining a compensating relative movement between the lens and the image sensor of the second camera unit; and controlling the actuator of the second camera unit to produce the compensating relative movement using the digital interface.

29. The OIS system of claim 1, wherein the OIS controller and the actuator circuit are implemented in separate packages coupled by the digital interface.

30. The OIS system of claim 29, wherein the OIS controller and the motion sensor are implemented in the same package.

31. The OIS system of claim 1, wherein the OIS controller and the actuator circuit are implemented in a single package.

* * * * *